US012162241B2

(12) United States Patent
Légier et al.

(10) Patent No.: US 12,162,241 B2
(45) Date of Patent: Dec. 10, 2024

(54) CREASING TOOL AND METHOD OF CREATING CREASE LINES

(71) Applicant: Bobst Lyon, Bron (FR)

(72) Inventors: Christian Légier, Lyons (FR); Julien Durand, Châtonnay (FR)

(73) Assignee: Bobst Lyon, Bron (FR)

( * ) Notice: Subject to any disclaimer, the term of this patent is extended or adjusted under 35 U.S.C. 154(b) by 28 days.

(21) Appl. No.: 17/999,416

(22) PCT Filed: May 26, 2021

(86) PCT No.: PCT/EP2021/063987

§ 371 (c)(1),
(2) Date: Nov. 21, 2022

(87) PCT Pub. No.: WO2021/239783

PCT Pub. Date: Dec. 2, 2021

(65) Prior Publication Data

US 2023/0234320 A1 Jul. 27, 2023

(30) Foreign Application Priority Data

May 26, 2020 (EP) .................................... 20315265

(51) Int. Cl.
*B31F 1/08* (2006.01)

(52) U.S. Cl.
CPC .................................... *B31F 1/08* (2013.01)

(58) Field of Classification Search
CPC ............ B31F 1/08; B31F 1/10; B31B 50/252
See application file for complete search history.

(56) References Cited

U.S. PATENT DOCUMENTS

| | | | |
|---|---|---|---|
| 2,223,503 A | 12/1940 | Wilson | |
| 2014/0018225 A1* | 1/2014 | Capoia | B31F 1/10 493/405 |
| 2017/0080668 A1* | 3/2017 | Takeuchi | B31F 1/08 |
| 2017/0190135 A1* | 7/2017 | Takeuchi | B31B 50/256 |
| 2018/0113447 A1* | 4/2018 | Featherstone | B65B 59/001 |
| 2020/0290303 A1* | 9/2020 | Blomberg | B31B 50/146 |

FOREIGN PATENT DOCUMENTS

| | | |
|---|---|---|
| CN | 110869201 A | 3/2020 |
| JP | S59027263 A | 2/1984 |
| JP | H1110753 A | 1/1999 |

(Continued)

*Primary Examiner* — Andrew M Tecco
*Assistant Examiner* — Nicholas E Igbokwe
(74) *Attorney, Agent, or Firm* — Bookoff McAndrews, PLLC

(57) ABSTRACT

A creasing tool (53) configured to create a crease line (11, 12) in a fibrous substrate (35), the creasing tool comprises a contact portion (50) having a base surface (57) and a relief portion (54), the relief portion is provided as a protruding pattern extending from the base surface (57) and is configured to be pressed against said fibrous substrate, wherein the relief portion (54) comprises a crease-line forming portion (56) and a peripheral deformation portion (59), and wherein the peripheral deformation portion comprises a plurality of discrete segments in the shape of curved transverse surface areas (58) extending in a direction (E) transverse to a longitudinal direction (L) of the crease-line forming portion (56).

16 Claims, 12 Drawing Sheets

(56) References Cited

FOREIGN PATENT DOCUMENTS

| | | | |
|---|---|---|---|
| JP | 3089398 | B2 | 9/2000 |
| JP | 2001205718 | A | 7/2001 |
| JP | 2004042266 | A | 2/2004 |
| JP | 2004148763 | A | 5/2004 |
| JP | 2004167983 | A | 6/2004 |

* cited by examiner

CREASING TOOL AND METHOD OF CREATING CREASE LINES

CROSS-REFERENCE TO RELATED APPLICATION(S)

This application is a National Stage Application under 35 U.S.C. § 371 of International Application No. PCT/EP2021/063987, filed May 26, 2021, which claims priority to European Application No. 20315265.7, filed on May 26, 2020, the entireties of which are incorporated herein by reference.

TECHNICAL FIELD OF THE INVENTION

The present invention relates to a creasing tool which is particularly suitable in the production of cardboard boxes.

BACKGROUND OF THE INVENTION

In the packaging industry, cardboard boxes are often made from cardboard sheets. The cardboard sheets can be processed in an assembly such as a folder-gluer arrangement in which they are printed (when necessary), cut and creased, and then folded and glued so as to form flat-folded boxes, also oftentimes referred to as "folding boxes".

Corrugated cardboard is a material typically comprising a fluted corrugated sheet, and two linerboards applied on each side of the fluted corrugated sheet. Corrugated cardboard combines light weight with high strength and is especially suitable as packaging material.

In order to fold the cardboard sheet, crease lines in perpendicular directions need to be created. Some of the crease lines will then coincide with the direction of the fluting, while others will be in a transverse direction. The crease lines can be made in a platen press machine, where a die is provided with a protruding edge that is pressed against the cardboard sheet to create the crease lines. It is also possible to form crease lines by using a rotating creasing disc provided with a protruding annular creasing ridge. The creasing disc is typically incorporated into a folder-gluer machine. The folder-gluer machine can also be referred to as a converting machine or converting inline machine. The converting machine converts or changes a web or sheets of material into an intermediate form or finished flat-folded boxes.

The precision of the folding process is dependent on the quality of the crease lines applied on the cardboard, i.e. on the correct position, the regularity of the shape and the depression depth of the crease. The sharper the creasing ridge becomes, the better the quality of the crease applied on the cardboard. However, sharp creasing ridges can tear the cardboard.

When the creasing ridge is applied in the direction transverse to the longitudinal direction of the flutes, the compression force from the creasing tool tends to be distributed over a plurality of points where the top paper liner and the inner fluted corrugated sheet are connected. However, if the crease line is to be formed in a direction coinciding with the longitudinal direction of the flutes, there is a large variation of the bending resistance of the cardboard. Consequently, the top linerboard may rupture if pressure is applied where the top paper liner and the inner fluted corrugated sheet are disconnected.

SUMMARY OF THE INVENTION

In view of the above-mentioned problems, it is an object of the present invention to provide a creasing tool and a method of forming well-defined and precise crease lines while reducing the risk of tearing the paper liner.

The object of the present invention is solved by a creasing tool according to claim 1 and a method according to claim 16.

According to a first aspect of the present invention, it relates to a creasing tool configured to create a crease line in a fibrous substrate, the creasing tool comprises a contact portion having a base surface and a relief portion, the relief portion is provided as a protruding pattern extending from the base surface and is configured to press against said fibrous substrate,

- wherein the relief portion comprises a crease-line forming portion and a peripheral deformation portion, and
- wherein the peripheral deformation portion comprises a plurality of discrete segments in the shape of curved transverse surface areas extending in a direction transverse to a longitudinal direction of the crease-line forming portion.

The fibrous substrate is also referred to as corrugated cardboard substrate in the context of this invention. For a creasing tool in the form of a creasing disc, the longitudinal direction is in the direction of rotation of the creasing disc. The longitudinal direction is thus extending around the circumference of the creasing tool.

The invention is based on a realization that the deformation from the creasing tool needs to be gradually distributed over the fibrous substrate to touch both the weak areas where the paper liner and the corrugated layer are disconnected and the stronger areas where those two elements are connected. This will create a more distributed pressure onto the fibrous substrate, regardless of where the crease-line forming portion on the creasing tool contacts the fibrous substrate. The peripheral deformation portion is thus configured to apply a gradually increased contact pressure on the fibrous substrate in a direction towards the crease-line forming portion.

The plurality of discrete segments extending in a transverse direction apply pressure on the fluting of the fibrous substrate not only along the direction in which the fluting extends. With other words, the discrete segments work on the fluting to make a gradual transition into the main crease line. This helps preventing the tearing of the sheet around the main crease line.

In an embodiment, the crease line-forming portion and the peripheral deformation portion are connected. This means that the relief portion is continuous from the crease-line forming portion to the peripheral deformation portion.

Continuous in the context of the present invention means that the crease-line forming portion is in the shape of a line or a surface area with a continuous protruding relief pattern projecting from the base surface.

The relief portion can be centrally arranged on the contact portion. In an embodiment, the peripheral deformation portion is arranged laterally of the crease-line forming portion on at least one side thereof.

Preferably, the peripheral deformation portion is arranged on both sides of the crease-line forming portion. In this way, the peripheral deformation portion can extend over a larger distance on the fibrous substrate and reduces the risk for rupture on both sides of the crease-line forming portion.

The crease-line forming portion can be a continuous line. The line can be straight. Alternatively, the line can be provided with a zigzag shape.

In an embodiment, the crease-line forming portion is protruding further from the base surface than the peripheral deformation portion. The difference in height enables the formation of a well-defined crease line. In an embodiment, there is a discontinuity in the junction between the crease-line forming portion and the peripheral deformation portion, whereby the transition between the crease-line forming portion and the peripheral portion is discontinuous. In other words, there is not a constant gradual slope in the transition.

The peripheral deformation portion is preferably downwardly sloped at an angle in a direction from the crease-line forming portion and towards an edge of the creasing tool. The angle is defined in relation to the rotation axis of the tool.

This gradually increases the compression depth towards the central portion of the creasing tool when the creasing tool is in contact with the fibrous substrate. The peripheral deformation portion can be downwardly sloped in at an angle ranging from 0° to 36°, preferably of from 2° to 10°. The inclined outer surface of the creasing tool allows for a smoother contact angle between the creasing tool and the inner linerboard, thereby giving the possibility trough the mechanical calibration to manage the total width of the crease mark and thereby increase the folding angle without stress or rupture. For most cardboard substrates, angles larger than 36° will typically not allow to take the full advantages of the transverse segment design. Moreover, it can concentrate the mechanical pressure on a small surface which could create an increased tearing phenomenon on the inner liner.

In an embodiment, the transverse surface areas in the peripheral deformation portion are linearly shaped and have a proximal portion located in the crease-line forming portion and a distal end shaped as a free end.

In an embodiment, the creasing tool further comprises a midrib and wherein the midrib is protruding further from the base surface than the proximal portion of the transverse surface areas. The difference in height will enable the formation of a well-defined crease line. Hence, there is a discontinuity in the junction between the crease-line forming portion and the peripheral deformation portion, whereby the transition between the crease-line forming portion and the peripheral deformation portion is discontinuous (i.e. does not show a constant gradual slope in the transition).

The transverse surface areas may have a larger cross-sectional area in their proximal portion than in their distal portion. This may achieve a less sharp crease line and can be especially used when a larger folding zone is desired. This type of transverse surface areas may be advantageous for creasing discs used as pre-creasers. The pre-creasing disc and a downstream located main creasing disc provide for a two-step crease-line forming process. This allows for a gradual and smooth crease-line forming process.

The transverse surface areas are in the context of the present invention defined as linear elements, which can be either be straight or curved, and may have a uniform or varying thickness.

The crease-line forming portion can be located centrally on the contact portion and the transverse surface areas on the first side and second side of the crease-line forming portion can be mirrored around a central axis defined by the crease-line forming portion and preferably offset in relation to each other. As example, the transverse surface areas on the first side can be offset in relation to the transverse surface areas on the second side. Hence, the transverse surface areas are placed so that they alternate. Hence, the pattern of the creasing tool can resemble to a herringbone. Such an arrangement provides distributed mechanical pressure applied by the creasing tool on the linerboard. This distributes the deformation footprint from the peripheral portion such that there is constantly a transverse segment contacting the fibrous substrate.

In one embodiment, the transverse surface areas can be straight. This has a technical effect that the transverse surface areas can extend over a greater length than if they were curved. In an embodiment, the transverse surface areas can have a consistent cross-sectional area along their length.

In another embodiment, the transverse surface areas are shaped as linear elements and wherein the linear elements are converging at the central crease-line forming portion, whereby the proximal portions of the linear elements form the crease-line forming portion. This arc-shape enables the transverse surface areas to form a substantially straight central creasing line on the fibrous substrate. This also enables a gradual transition as a curved edge is found to be smoother in deforming the flutes.

The present creasing tool can be used in a slotter assembly of a converting machine, which is configured for creating flat-folded cardboard boxes.

In an embodiment, the present creasing tool is provided in a platen press. The creasing tool can be a die, configured to be moved up and down and press against the fibrous substrate in the vertical direction. Alternatively, the creasing tool can be provided as a creasing disc.

The discrete segments are extending at an angle in relation to a central axis defined by the central crease-line forming portion.

The creasing tool can be generally ring-shaped. This allows for easily mounting the creasing tool e.g. on a cylinder or a shaft of a creasing device. In this way, the crease lines can be applied on the cardboard by rotating the creasing tool and thereby bringing the creasing tool into contact with the cardboard. In an embodiment, the creasing tool can be provided in two half-ring-shaped parts, such that it can be mounted around a shaft without disconnecting the ends of the shaft. The two parts can be attached together by fasteners (such as bolts or screws) and may optionally be provided with attachment brackets, which cooperate with the fasteners and creasing tool parts in order to form a rigid disc assembly.

According to a second aspect, the present invention relates to a converting machine such as a folder-gluer machine, comprising a creasing tool configured as a creasing disc as per the first aspect of the present invention, wherein the creasing disc is mounted in the converting machine such that the transverse surface areas are extending in a transverse direction at an angle in relation to the central axis and in the direction of rotation of the disc, said angle being less than 90 degrees such that the distal ends of the transverse surface areas are brought into contact with the fibrous substrate before the proximal portions of the discrete segments.

According to a third aspect, the invention relates to a method of creating a crease-line in a fibrous substrate with a creasing tool according to the first aspect of the present invention, the method comprises the steps of:

- Selecting a fibrous substrate having at least one corrugated layer,
- Measuring a distance between the flutes in the at least one corrugated layer,
- Selecting a creasing tool having a transverse length of the transverse surface areas which equal or larger than 50% of the flute distance, and
- Pressing the tool against the fibrous substrate such that a crease-line is obtained.

In an embodiment, the transverse length of the transverse surface areas is equal or larger than the flute distance. Hence, each discrete transverse surface areas in the peripheral portion applies a compression force on at least two flutes, during formation of the crease, such that the risk of tearing or otherwise damaging the linerboard is reduced.

The creasing tool can comprise a variable number of transverse surface areas, this number being led by the number of transverse surface areas simultaneously in contact with the cardboard, less than per linear centimeter, preferably less than per linear centimeter. A lower number of transverse surface areas might not provide a sufficiently sharp folding line, while a higher number of transverse surface areas would create a too smooth outer surface on the creasing tool and the creasing ring may not create a sufficient difference of pressure compared to the peripheral portion which does not sufficiently define the folding line.

Preferably, at every position along the crease-line forming portion of the creasing tool, at least a part of a transverse surface areas is present on the outer surface of the creasing tool.

BRIEF DESCRIPTION OF THE DRAWINGS

Further advantages and features will become apparent from the following description of exemplary embodiments of the present invention and from the appended figures, in which like features are denoted with the same reference numbers and in which.

DETAILED DESCRIPTION

Figure 1:
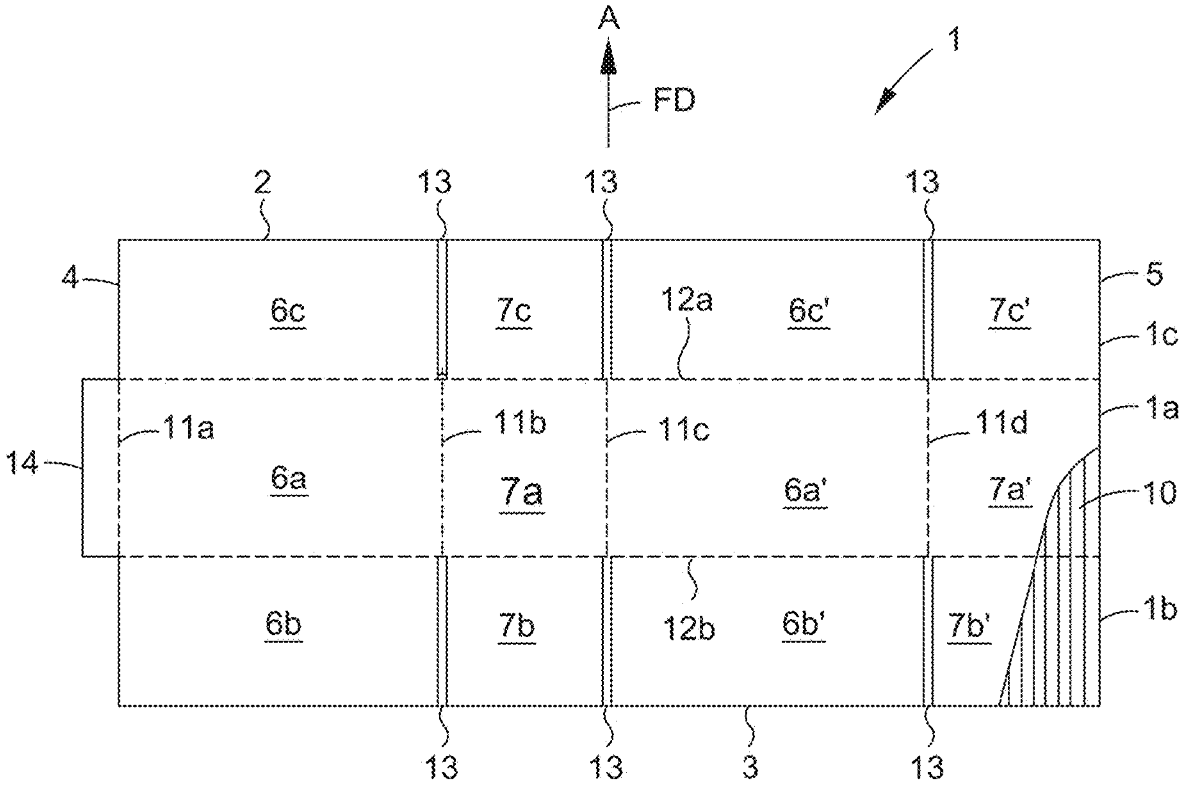
FIG. 1 shows a plan view of a flat cardboard blank.
Figure 2A:
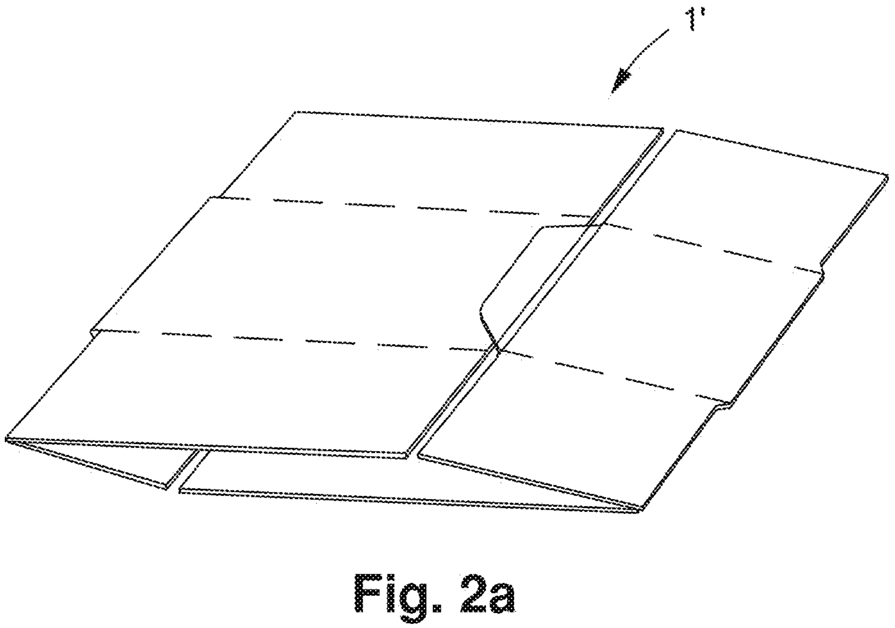
FIG. 2*a* shows a schematic perspective view of a flat-folded and glued box obtained from the blank shown in FIG. 1.

FIG. 1 shows an example of an intermediate blank 1 made from corrugated cardboard and which is used for manufacturing a folding box 1', such as the one shown in FIG. 2*a.*

Figure 2B:
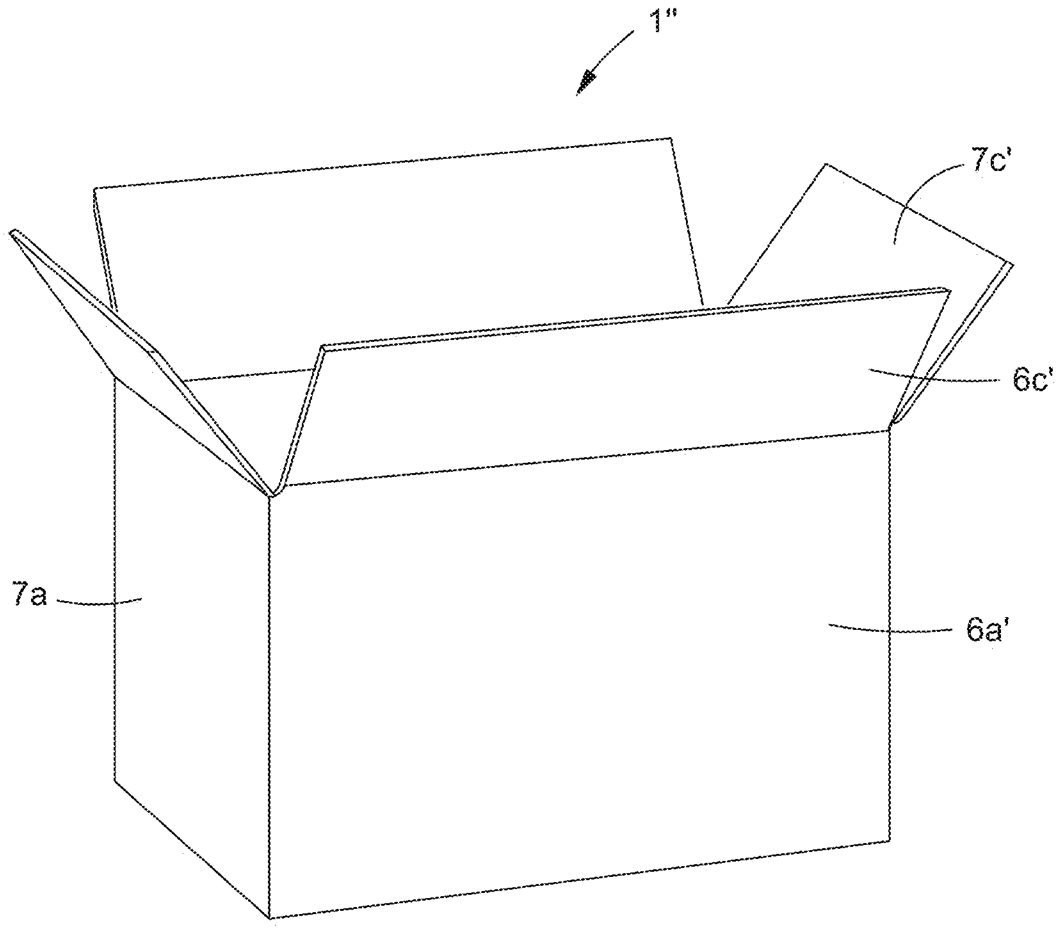
FIG. 2*b* shows a schematic perspective view of an assembled box obtainable from the flat-folded box shown in FIG. 2*a;*

When a folding box 1' is manufactured, a fibrous substrate 35 in the form of a cardboard web or sheet goes through a plurality of workstations in a converting machine 19 that print, cut to shape, prepare the fibrous substrate 35 for folding, glue and fold the fibrous substrate 35. The intermediate blank 1 in FIG. 1 has been creased, cut to shape and prepared for folding. As illustrated, the intermediate blank 1 may present generally a rectangular flat shape with two parallel edges of larger length. In order to create a folding box 1', the intermediate blank 1 needs to be further folded and glued in separate processing modules of the converting machine 19. The folding box 1' can in a final step be assembled to form a three-dimensional box 1" as the one illustrated in FIG. 2*b.*

Figure 3:
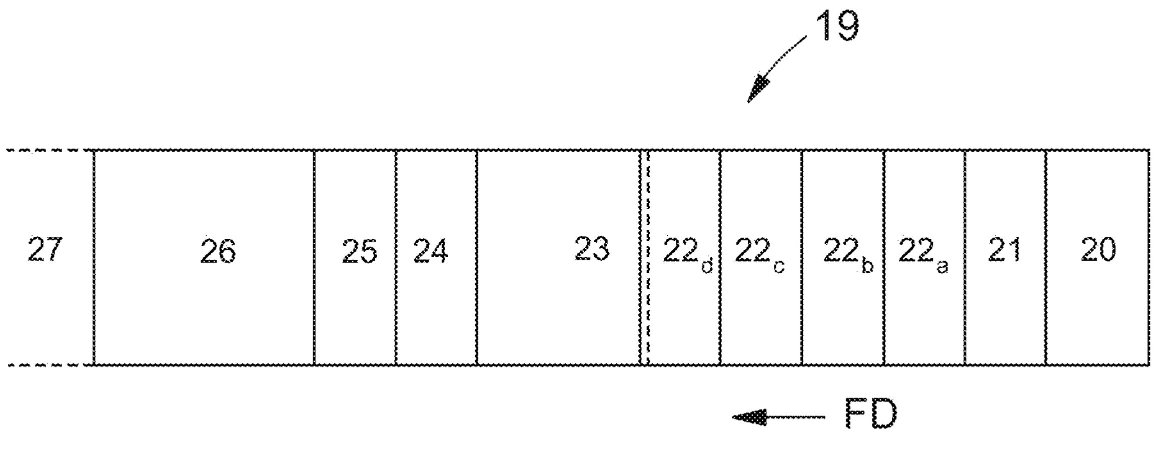
FIG. 3 shows a schematic diagram of a converting machine.

As shown in FIG. 1, the intermediate blank 1 comprises a front edge 2 which should be placed forward and perpendicular to a processing/driving direction FD the converting machine 19. As schematically illustrated in FIG. 3, the front edge 2 is typically entered into folding-gluing modules 26 of the converting machine 19 which will subsequently fold and glue the blank 1. The converting machine 19 comprises several units aligned along the longitudinal axis and the driving direction FD of the sheets.

In order to enable the blank 1 to be folded into a three-dimensional box, a plurality of crease lines 11, 12 are needed. Different format and models of folding boxes 1' have different number and positions of the crease lines 11, 12. The illustrated intermediate blank 1 and the configuration of the cuts and crease lines are just an example of numerous different intermediate blanks 1 which can be used for producing a folding box 1' suitable for forming a three-dimensional folded box.

As illustrated in FIG. 1, the crease lines 11, 12 of the exemplary illustrated intermediate blank 1 are distinguished into two groups, where a first group 11 is configured as parallel crease lines 11*a*, 11*b*, 11*c*, 11*d* which are coinciding with the driving direction FD of the folder-gluer machine 19. A second group of crease lines 12 are perpendicular crease lines 12*a*, 12*b*, and are thus perpendicular to the first group of parallel crease lines 11*a*, 11*b*, 11*c*, 11*d.*

Two lateral edges of smaller length define a left edge 4 and a right edge 5 are provided. The left edge 4 presents cutouts along its two end portions so as to define a flap 14 in the middle of the left edge 4. Front 12*a* and rear crease lines 12*b* of the second group of crease lines 12 are respectively parallel to the front and rear edges 2 and 3 define a central portion 1*a* of the blank 1 which is intended to constitute the peripheral face of the folding box 1' when assembled to form a three-dimensional box. The central portion 1*a* is placed between a rear portion 1*b*, which is intended to constitute the bottom face, and a front portion 1*c* which is intended to constitute the upper face of the folding box 1" when assembled to form a three-dimensional box 1".

The first group of parallel crease lines 11 are typically parallel to the left and right edges 4 and 5, as well as to flutes 10 of the corrugated layer of the cardboard. This group of parallel crease lines 11 may extend along the whole width of the central portion 1*a*. One of the crease lines 11*a* is adjacent to the flap 14, as the other of the crease lines 11*c*, called central crease, is aligned with the longitudinal axis A. In line with crease lines 11 and central crease 11*a*, the rear and front portions 1*b* and 1*c* can in some embodiments be cut so as to create slits 13 extending on the whole width of the rear and front portions 1*b* and 1*c*.

The slits 13 define respectively two pairs of panels in each of the rear and front portions 1*b* and 1*c*, respectively a first pair of large rear panels 6*b* and 6*b*', a second pair of large front panels 6*c* and 6*c*', a first pair of small rear panels 7*b* and 7*b*' and a second pair of small front panels 7*c* and 7*c*'. The large rear and front panels 6*b*, 6*c* and 6*b*', 6*c*' are located respectively on each side of a large central panel 6*a* and 6*a*'. In a similar manner small rear and front panels 7*b*, 7*c* and 7*b*', 7*c*' are located respectively on each side of a small central panel 7*a* and 7*a'*.

Crease lines 11, 12 and their slits 13 enable to fold the blank 1 into a folding box 1' with a rectangular shape, each crease line 11, 12 defining a folding line (see FIG. 1). During the folding process, glue is typically deposited onto the flap 14 and the large left central panel 6*a* is thus joined to the small right central panel 7*a'*.

Many different configurations of a converting machine 19 are possible. The schematically illustrated and exemplary converting machine 19 in FIG. 3 comprises successively from upstream to downstream in the driving direction FD a loader 20 for automatically loading the fibrous substrate 35 in the form of sheets, a feeder 21, optionally a plurality of flexography printing units 22*a* to 22*d*, a converting unit with at least one slotter assembly 23 and at least one cutting unit 24, a waste-stripping and an optional vibrating unit 25, and a folding-gluing unit 26. The converting machine 19 may also further comprise optional modules 27 such as a counting-ejecting unit, a bundler and a palletizer (represented partially with dotted lines in FIG. 3).

Figure 4:
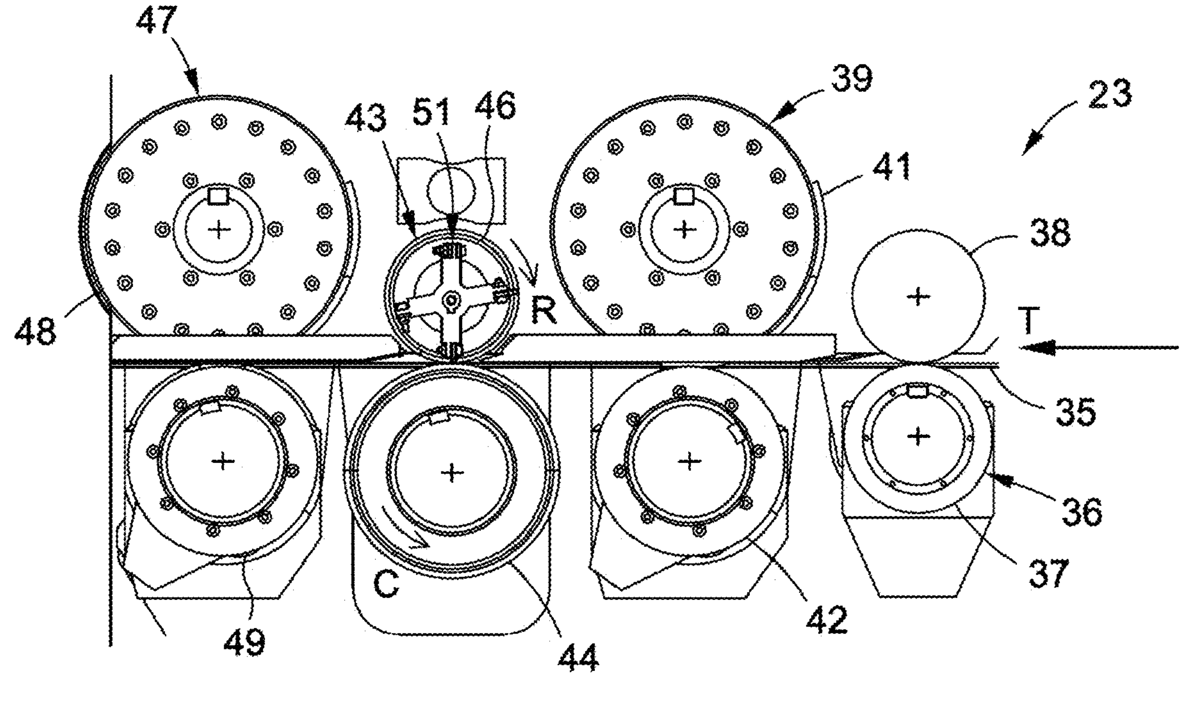
FIG. 4 shows a cross-sectional view of a slotting unit of the converting machine of FIG. 3.

As illustrated in FIG. 4, the slotter assembly 23 processes printed fibrous substrates 35 exiting from the last printing unit 22*d* and transforms them into intermediate blanks 1 (see FIG. 1). The slotter 23 assembly is equipped with various rotary tools that comprise cutting tools or knives that form the edge cuts (1*b*, 1*a* and 1*c* as seen in FIG. 1), the slits 13, and the cuts delimiting transversally the flap 14, and creasing devices or creasers that form the longitudinal crease lines 11. It will be noted that the transverse crease lines 12 are produced upstream or downstream of the slotter 23 (depending the type and configuration of the converting machine) or are initially provided in the fibrous substrate 35.

The rotary tools are mounted on transverse bearing shafts driven in rotation by shaft motors. The speed of rotation of the tools preferably corresponds to the operating speed, i.e. the drive speed and running speed T of the fibrous substrate 35.

In the illustrated embodiment, the slotter 23 comprises, from upstream to downstream, a precreasing section 36, with a first pair of shafts positioned one above the other. The precreasing section 36 prepares the cardboard for the subsequent formation of the priority folding line. The precreaser is thus configured to create a precreasing area on the fibrous substrate 35, which is a partially deformed area on the fibrous substrate 35. The lower shaft is provided with a lower precreaser 37 and the upper shaft carries an upper precreaser 38, which is the counterpart of the lower precreaser 37. The precreasing section 36 carries out a first initial creasing operation, as the longitudinal crease lines 11 are being creased in two successive operations.

A first slotting section 39, with a second pair of shafts positioned one above the other, is mounted downstream of the precreasing section 36. The upper shaft of the first slotting section 39 is provided with a disk equipped with knives 41 and the lower shaft is provided with a lower counter blade 42. The first slotting section 39 cuts the slits 13 placed at the rear of the blank 1.

A creasing section 43, with a third pair of shafts positioned one above the other, is mounted downstream of the first slotting section 39. The lower shaft of the creasing section 43 is provided with a lower creaser 44 and the upper shaft is provided with an upper creaser 46, which is the counterpart of the lower creaser 44. The creasing section 43 carries out the second and final creasing operation, including the formation of the priority crease line and thus ensures the permanent and precise marking of the longitudinal crease lines 11.

A second slotting section 47, with a fourth pair of shafts positioned one above the other, is mounted downstream of the creasing section 43. The upper shaft of the second slotting section 47 is provided with a disc equipped with knives 48 and the lower shaft is provided with a lower counter blade 49. The second slotting section 47 cuts the slits 13 positioned at the front of the blank 1.

In order to cut out the glue flap 14 and make the rear cut and the front cut of the flap 14, the processing unit 43 may comprise a device 51 for processing the fibrous substrates 35. The device 51 is placed in the creasing section. Given the proximal position of the flap 14 on the blank 1, the device 51 is preferably mounted on the operator-side end of the upper shaft in the creasing section 43.

The lower and upper pre-creasers 37 and 38 as well as the lower and upper creasers 44 and 46 are creasing devices with creasing tools 53. Accordingly, the creasing tools 53 are mounted in the creasing section 43 on the shafts, which function as a support for the respective creasing tool 53. It is also possible to arrange the precreaser 37 and the creaser 44 either above or below the fibrous substrate 35.

Figure 5A:
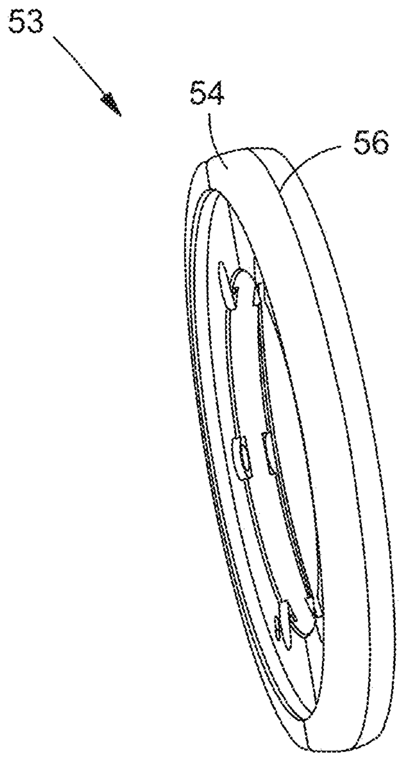
FIG. 5*a* shows a standard creasing tool as known in the state of the art.
Figure 5B:
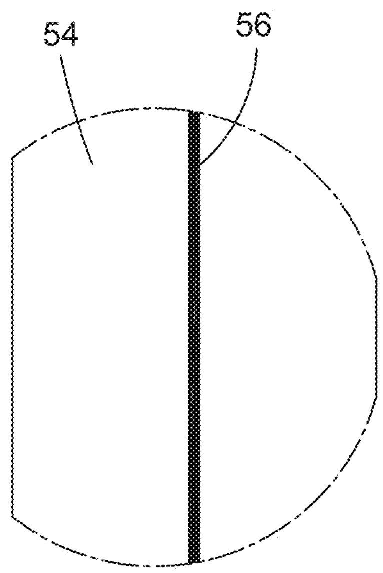
FIG. 5*b* shows a detail of the creasing tool of FIG. 5*a;*
Figure 5C:
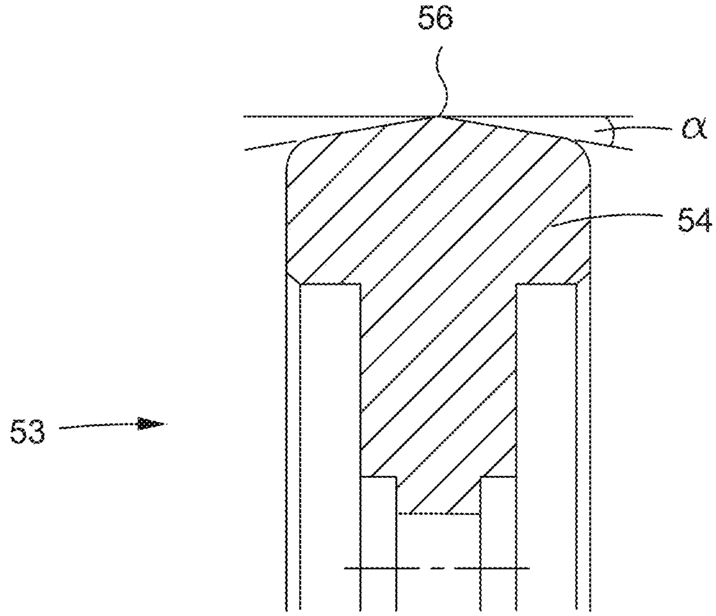
FIG. 5*c* shows a cross-section through the creasing tool of FIG. 5*a;*

In FIGS. 5*a* to 5*c* a creasing tool 53 as known in the state of the art is schematically illustrated. The creasing tool 53 can be used in the precreasing section 36 and the creasing section 43 (see FIG. 4). The creasing tool 53 is ring-shaped and can be mounted on a shaft of a converting machine 19, as long as the inner diameter of the creasing tool 53 is chosen according to the respective shaft dimensions. The ring-shaped creasing tool 53 can be provided in two half-ring-shaped parts such that it can be mounted around the shaft and form a complete ring when mounted.

The creasing tool 53 comprises a relief portion 54 with a crease-line forming portion 56 in the shape of a creasing ridge or midrib 56 on an outer surface of the creasing tool 53. By pressing the relief portion 54 against the fibrous substrate 35, crease lines 11, 12 can be formed by deforming the linerboard and the flutes 10 of the fibrous substrate 35.

Now referring to FIGS. 8*a* to 11*c*, in which embodiments of a creasing tool 53 according to the present invention are illustrated. As can be seen in the embodiment illustrated in FIG. 8*a*, the disc-shaped creasing tool 53 has a contact portion 50 with a total width W. The creasing tool 53 can be provided in two parts 53*a*, 53*b*, such that it can be mounted around a shaft without disconnecting the ends of the shaft. The two parts 53*a*, 53*b* can be assembled in a joint 55 such that a disc is formed.

The contact portion 50 comprises a relief portion 54 which is provided with a protruding crease-line forming pattern.

Laterally of the relief portion 54, the creasing tool 53 may comprise an outer portion configured as a base portion 57. The base portion 57 can be provided with a smooth surface (i.e. not provided with a creasing pattern). Optionally, the base portion 57 can be curved. The relief portion 54 is in contact with the fibrous substrate 35 during the creasing operation, while the base portion 57 is positioned at a distance from the fibrous substrate 35.

Figure 8A:
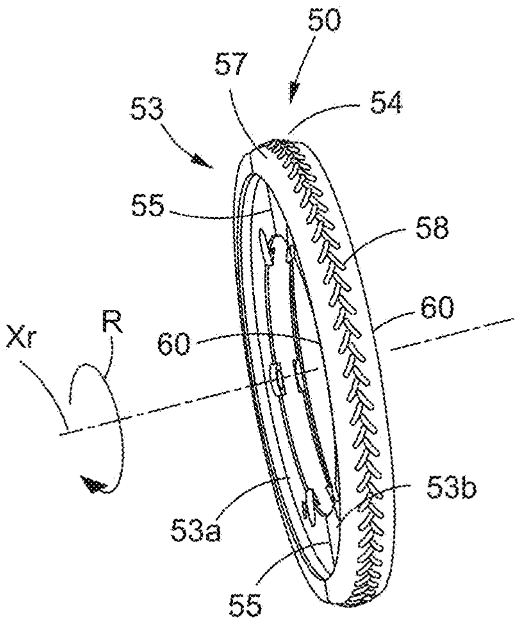
FIG. 8*a* shows a first embodiment of a creasing tool according to the present invention.
Figure 8B:
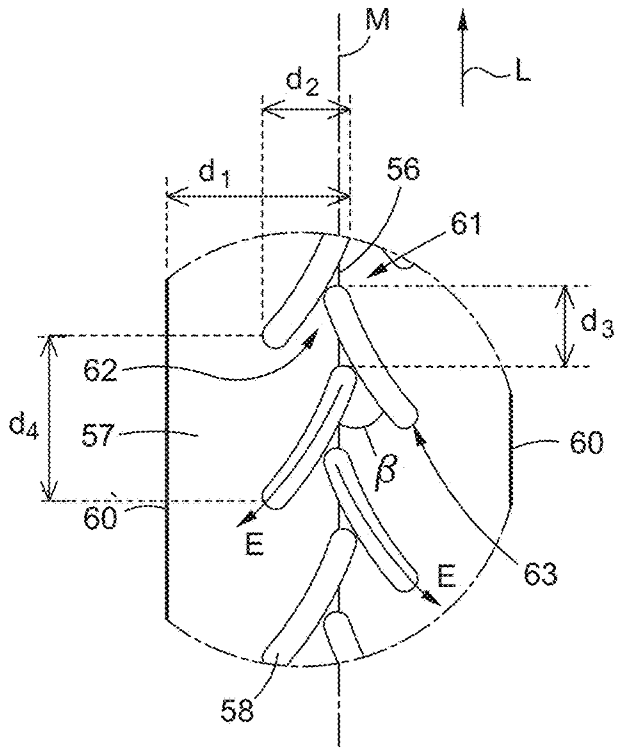
FIG. 8*b* shows a detail of the creasing tool of FIG. 8*a;*
Figure 8C:
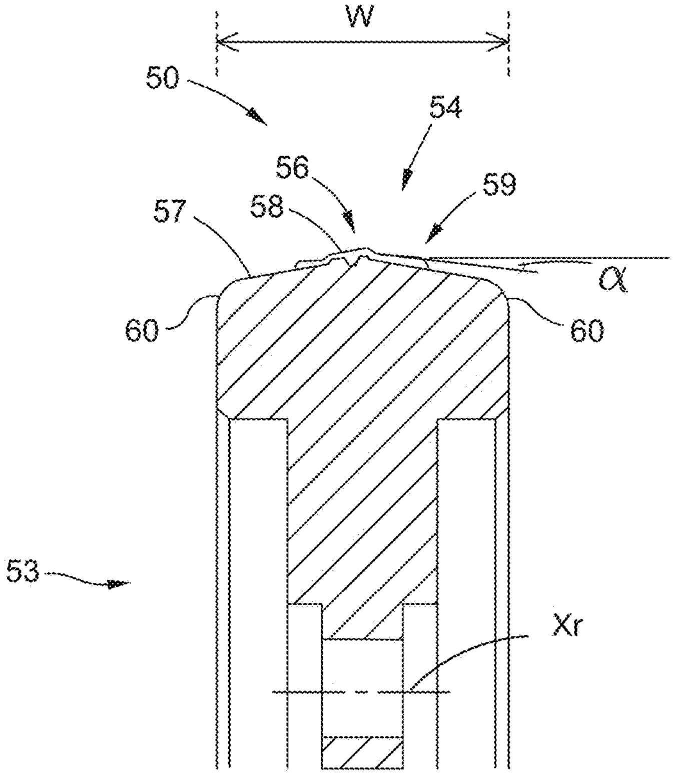
FIG. 8*c* shows a cross-section through the creasing tool of FIG. 8*a;*
Figure 8D:
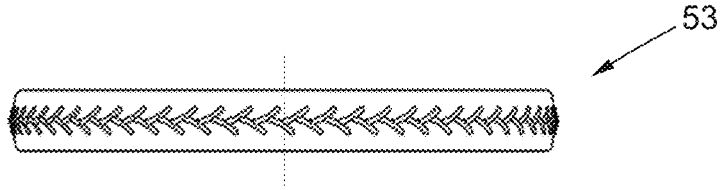
FIGS. 8*d* and 8*e* illustrate another embodiment of a creasing tool which is similar to the embodiment illustrated in FIGS. 8*a* to 8*c,*
Figure 8E:
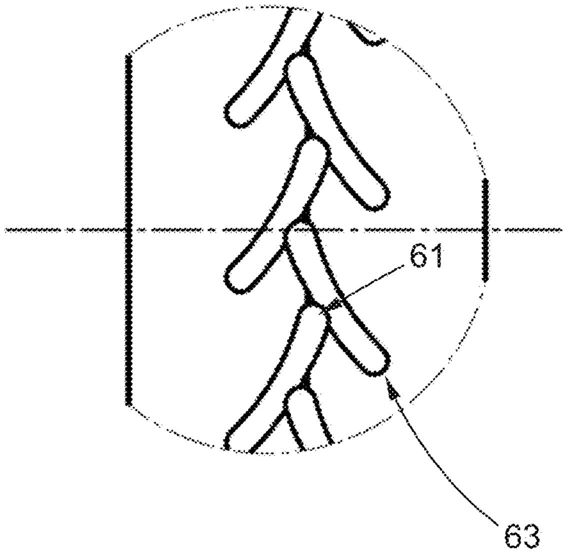

As best seen in FIG. 8*c*, the relief portion 54 comprises a crease-line forming portion 56 and a peripheral deformation portion 59. The peripheral deformation portion 59 is arranged laterally of the crease-line forming portion 56.

The crease-line forming portion 56 is a raised line extending around the circumference of the creasing tool 53. When the creasing tool 53 is pressed against the fibrous substrate 35, the crease-line forming portion 56 will create a central portion of the crease line. The central portion of the crease line defines the priority folding line, which is the precise location for the fold. The peripheral deformation portion 59 distributes the compression force from the creasing tool 53 over the fibrous substrate 35 in a gradual manner in a direction towards the crease-line forming portion 56. Hence, the compression on the fibrous substrate 35 is increased from the peripheral deformation 59 portion and thus concentrated towards the crease-line forming portion 56 of the creasing tool 53.

The peripheral deformation portion 59 is a discrete protruding pattern extending from the base surface 57. For instance, the peripheral deformation portion 59 can be designed to protrude between 0.5 and 1.6 mm from the base surface 57. The peripheral deformation portion 59 is provided with a plurality of transverse surface areas 58. The transverse surface areas 58 have a perpendicular length of $d_2$ (see FIG. 8*b*) in relation to the longitudinal direction L of the central crease-line forming portion 56. The transverse surface areas 58 extend in a transverse direction in relation to a longitudinal direction L of the central crease-line forming portion 56 and in relation to a central axis M of the creasing tool 53. These transverse surface areas 58 can be linearly shaped. In some embodiments the transverse surface areas 58 can be straight or curved. The transverse surface areas 58 can be shaped as chevrons 58, or as fishbones when seen together with the crease-line forming portion 56.

As best seen in FIG. 8*b*, the transverse surface areas 58 have a proximal portion 61 arranged at the crease-line forming portion 56 and a distal end (i.e. free end) 63 arranged at an outer edge of the relief portion 54. The distal end 63 is thus arranged further away from the crease-line forming portion 56 than the proximal portion 61. Hence, the transverse surface areas 58 extend along an extension direction E from the crease-line forming portion 56 towards an edge 60 of the creasing tool 53.

As the crease-line forming portion 56 is continuous and the peripheral deformation portion 59 is discrete, the deformation is concentrated to the crease-line forming portion 56. Consequently, the crease-line forming portion 56 is configured to create a sharp and precise crease line.

The present creasing tool 53 can be used in both a precreasing section 36 and a main creasing section 43.

The crease lines 11, 12 formed on the fibrous substrate 35 comprise a main crease line portion which is the center part of the crease lines 11, 12 and is provided by the crease-line forming portion 56. If the crease lines 11, 12 are provided by a main creasing tool 53, the main crease-line portion corresponds to the priority folding line. In another example, if the crease lines 11, 12 are provided by a precreaser, the main crease-line portion forms a main portion of a precreasing area. The crease lines 11, 12 are also provided with a peripheral crease-line portion, provided by the peripheral deformation portion 58.

In the embodiment illustrated in FIGS. 8*a* to 8*c*, the proximal portions 61 of the transverse surface areas 58 on a first side of the crease-line forming portion 56 are touching the transverse surface areas 58 on a second and opposite side of the crease-line forming portion 56.

Now referring to FIG. 8*c*, which further illustrates the geometry in cross-section through the creasing tool 53 of FIG. 8*a*. The relief portion 54 of the creasing tool 53 can be downwardly sloped from the crease-line forming portion 56 in a direction towards the edge 60 of the creasing tool 53 by the angle $\alpha$. The peripheral deformation portion 59 can thus be downwardly sloped at the angle $\alpha$ in a direction from the crease-line forming portion 56 and in relation to the rotary axis Xr of the creasing tool 53. This gradually increases the compression depth from the creasing tool 53 on the fibrous substrate 35 in a direction towards the central crease-line forming portion 56. During the rotation of the creasing tool 53, the compression depth into the fibrous substrate 35 caused from each transverse surface area 58 is gradually increased as the height of the transverse surface area 58 increases in the direction of rotation R.

The angle $\alpha$ is advantageously ranging from 0° to 36°, preferably from 2° to 10°. The angle $\alpha$ is determined relative to the position of the central crease-line forming portion 56. This range has been found to increase the folding angle without stress and limit the double-fold (i.e. squared fold) phenomenon. This inclination can be constant along the extension E of the transverse surface areas 58.

The direction of rotation R of the creasing tool 53 (see FIG. 8*a*) can be selected such that the distal ends 63 of the transverse surface areas 58 are pointing forward in the direction of rotation R and are therefore brought into contact with the fibrous substrate 35 before the proximal portion 61 of the transverse surface areas 58. This has an effect of creating an immediate contact with several flutes in the fibrous substrate 35 before the central crease-line forming portion 56 applies the center part of the folding line to the fibrous substrate.

As illustrated in FIGS. 8*a* and 8*b*, the proximal portions 61 can be arranged such that a proximal portion 61 is in contact with the transverse surface area 58 on the opposite side of the center axis M. Alternatively, in the embodiment illustrated in FIGS. 8*d* and 8*e*, the proximal portions 61 can be arranged to connect to the transverse surface area on the opposite side of the central axis M in such a way that the proximal portions 61 are penetrating into the opposite transverse surface areas 58. Commonly for both alternatives, the transverse surface areas 58 on one side of the central axis M preferably contact or penetrate the opposing transverse surface areas 58 on the other side of the central axis in the middle along its extension E.

Figure 6:
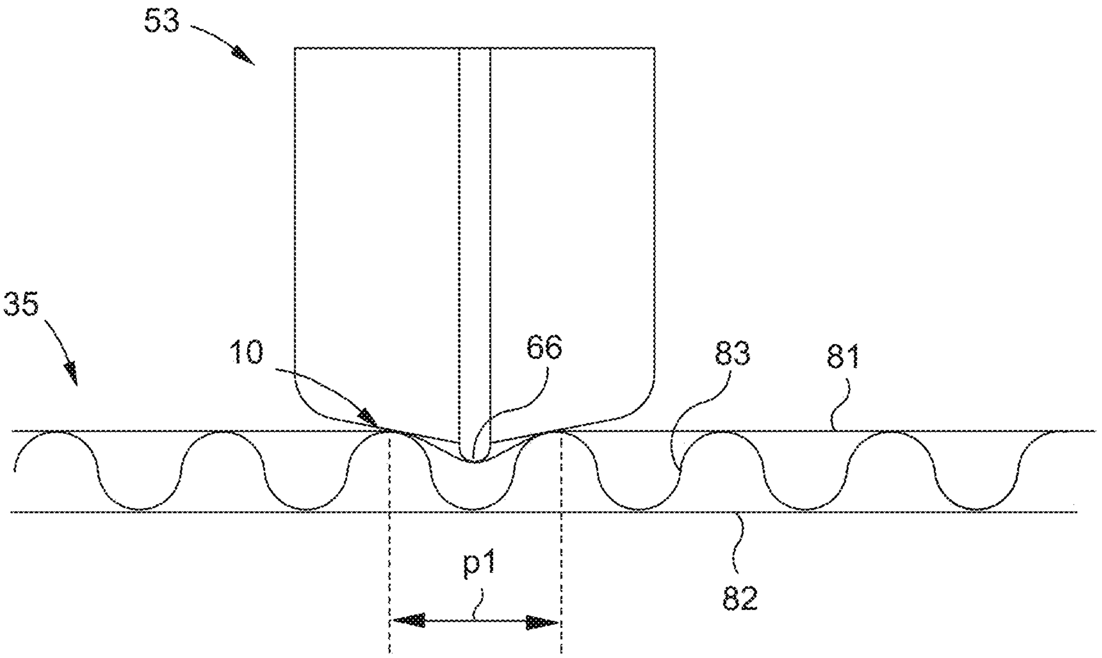
FIG. 6 shows a schematic cross-sectional view of a creasing tool in contact with a corrugated cardboard substrate.

As illustrated in FIG. 6, a corrugated fibrous substrate 35 may have the composition of a top paper liner 81, a bottom paper liner 82 and a corrugated fluted layer 83 arranged therebetween. As previously mentioned, rupture of the fibrous substrate 35 often occurs when a crease-line forming portion 56 is contacting the corrugated fibrous substrate 35 in positions where the top paper liner 81 and the corrugated fluted layer 83 are disconnected. This situation is illustrated in FIG. 6. The paper liner 81 of corrugated fibrous cardboard substrate 35 is within the context of this invention also referred to as "layer".

Figure 7:
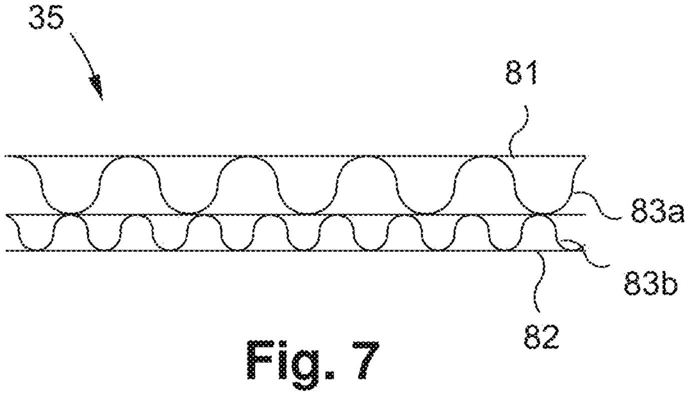
FIG. 7 shows a schematic cross-sectional view of cardboard substrate comprising a double-layered corrugated cardboard substrate.

As best seen in FIG. 8*b*, a transverse length $d_2$ (see FIG. 8*b*) of the transverse surface areas 58 is therefore advantageously selected based on the geometry of the corrugated fibrous cardboard substrate 35 and in particular the distances p1 between the flutes. Hence, the transverse length $d_2$ of the transverse surface areas 58 is selected to be equal or larger than the 50% of the peak-to-peak distance p1 between the flutes in the corrugated fibrous substrate 35. Alternatively, a distance of 100% of the peak-to-peak distance p1 can be selected. This ensures that the transverse surface areas 58 are in contact with a flute even if the creasing tool 53 is not positioned centrally in-between the flutes. For corrugated fibrous cardboard substrates with a plurality of corrugated fluted layers 83*a*, 83*b* and as illustrated in FIG. 7, the transverse length $d_2$ of the transverse surface areas 58 can be similarly selected to be equal or larger than 50% or correspond to 100% of the largest peak-to-peak distance p1 of the corrugated layers 83*a*, 84*b*. Alternatively, the transverse length $d_2$ can be selected from the peak-to-peak distance p1 of the upper corrugated layer.

The extension direction E of the transverse surface areas 58 may be straight, and in particular in combination with an annular and continuous annular ridge 66. However, as illustrated in FIGS. 8*a* to 8*e*, the transverse surface areas 58 can be provided with a curved shape, such that their proximal portions 61 converge to form a continuous central crease-line forming portion 56. The transverse surface areas 58 are curved from their proximal portion 61 to their distal ends 63. The curved shape can be provided by a single radius or a combination of several different radiuses along the extension E of the transverse surface areas 58. In the case where there are several different radiuses, the transverse surface areas 58 may have different sections, each having a different radius, The curved shape allows the transverse surface areas 58 to form both a continuous crease-line forming portion 56 and a peripheral deformation portion 59.

The transverse surface areas 58 are thus configured to gradually increase and direct the deformation on the fibrous substrate 35 converge into the central main crease-line portion. Hence, the proximal portions 61 of the transverse surface areas 58 form the crease-line forming portion 56. The outer periphery of the curved transverse surface areas 58 is concave in relation to the outer edges 60 of the creasing tool 57. Consequently, the convex side of the transverse surface areas 58 is located closer to the central axis M than the concave side.

The extension direction E of subsequent transverse surface areas 58 on opposite sides of the annular ridge 66 is mirrored and preferably offset at a distance $d_3$ along a central axis M defined by the central crease-line forming portion 56. This results in an alternating pattern of transverse surface areas 58.

The discrete segments or transverse surface areas 58 are extending in a transverse direction at an angle β in relation to the central axis M and in the direction of rotation of the disc R. The angle β is less than 90 degrees such that the distal ends 63 of the discrete segments or transverse surface areas 58 are brought into contact with the fibrous substrate 1 before the proximal portions 61 of the discrete transverse surface areas 58.

For curved transverse surface areas 58, there is thus a gradually reduced angle β of the extension E from the distal end 63 and to the proximal portion 61 in relation to the crease-line forming portion 56. This provides a gradual transition between the crease-line forming portion 56 and the peripheral deformation portion 59.

The transverse surface areas 58 on the first side of the crease-line forming portion 56 and the transverse surface areas of the second side of the crease-line forming portion 56 cooperate such that even if the transverse surface areas 58 are arranged in a discrete manner, there is a continuous transverse component in the peripheral deformation portion 59 that is applying a pressure on the flutes 10 in the fibrous substrate 35. This ensures a continuous compression force onto the fibrous substrate 35 in the transverse direction and a dense arrangement of the transverse surface areas 58 on the outer surface of the creasing tool 53.

As best seen in FIG. 8*b*, the transverse surface areas 58 may be placed equidistant on the outer surface of the creasing tool 53, wherein the distal ends 63 the transverse surface areas 58 are spaced apart at a distance $d_4$. If the transverse surface areas 58 are all of the same size, the distance $d_4$ between the proximal portions 61 is the same (i.e. constant) around the outer circumference of the creasing tool 53.

Figure 9A:
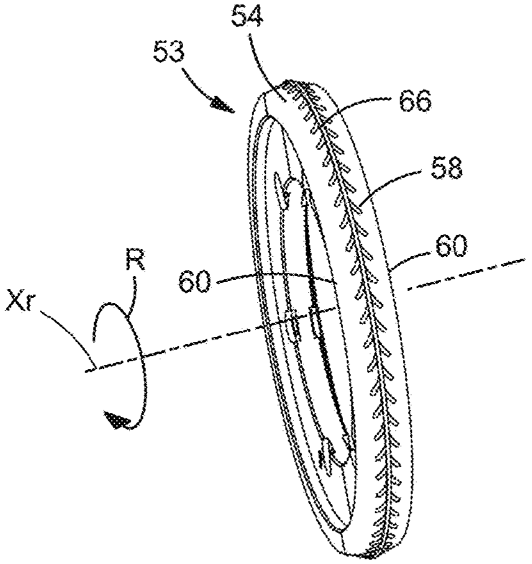
FIG. 9*a* shows a third embodiment of a creasing tool according to the invention.
Figure 9B:
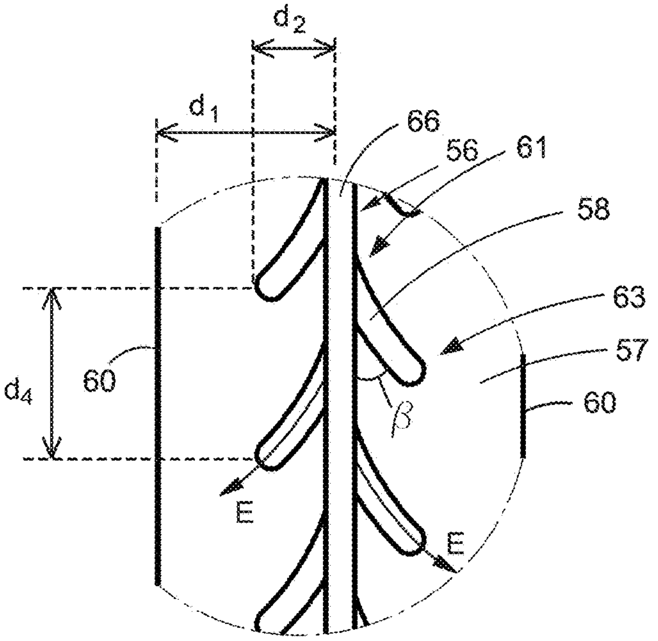
FIG. 9*b* shows a detail of the creasing tool of FIG. 9*a;*
Figure 9C:
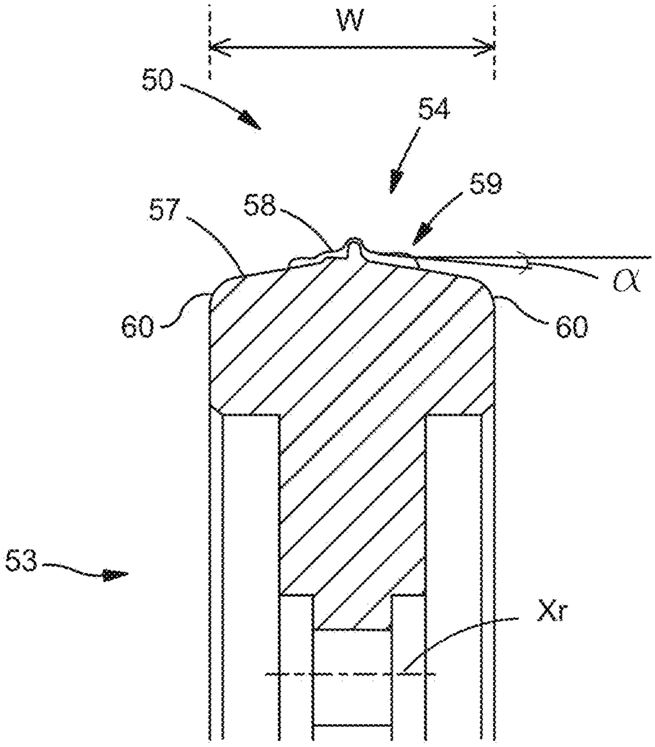
FIG. 9*c* shows a cross-section through the creasing tool of FIG. 9*a;*

In the third embodiment illustrated in FIGS. 9*a* to 9*c*, the creasing tool 53 is arranged in a similar way as in the first embodiment, but additionally comprises a continuous annular ridge 66 in the crease-line forming portion 56. The annular ridge 66 has a linear and straight shape extending along the central axis M. The annular ridge 66 thus extends around the outer circumference of the creasing disc 53.

The annular ridge 66 is arranged parallel to the edge 60 of the creasing tool 53. The annular ridge 66 is placed at a distance $d_1$, from the edge 60 which is preferably selected to correspond to about 50% of the total width W of the creasing tool 53, such that the midrib 56 is positioned in the center of the creasing tool 53.

Accordingly, the transverse surface areas 58 whose extension direction E extend from the annular ridge 66 towards the edge 60 of the creasing tool 53 are in contact with the annular creasing ridge 66. The annular ridge 66 may preferably protrude further from the base surface 57 than the proximal portions 61 of the transverse surface areas 58.

The annular creasing ridge 66 provides a sharper protrusion from the outer surface of the creasing tool 53 compared to the creasing tool of the first embodiment, therefore further increasing the sharpness of crease lines 11, 12 formed by the creasing tool 53. However, the transverse surface areas 58 still provide a gradually increasing deformation on the fibrous substrate 35 surface to prevent the fibrous substrate 1 from being teared.

Figure 10A:
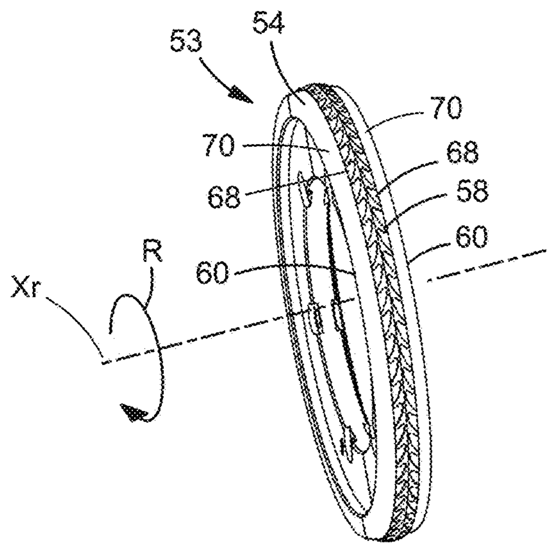
FIG. 10*a* shows a fourth embodiment of a creasing tool according to the invention.
Figure 10B:
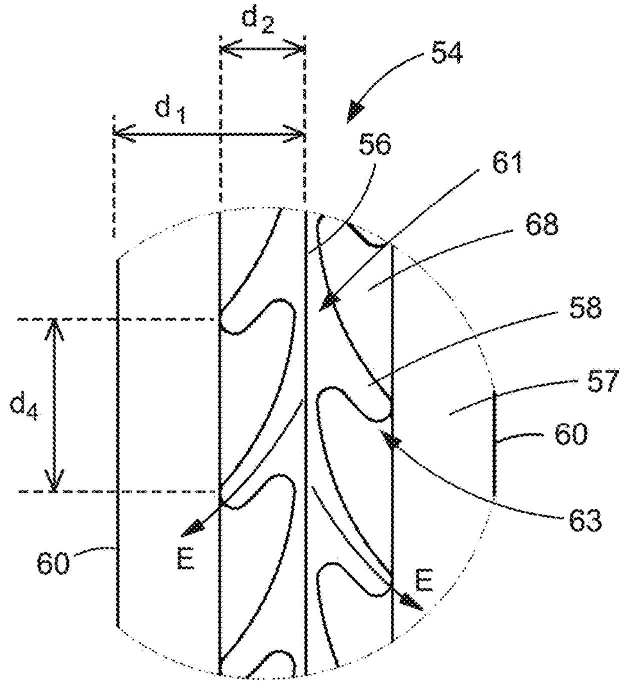
FIG. 10*b* shows a detail of the creasing tool of FIG. 10*a;*
Figure 10C:
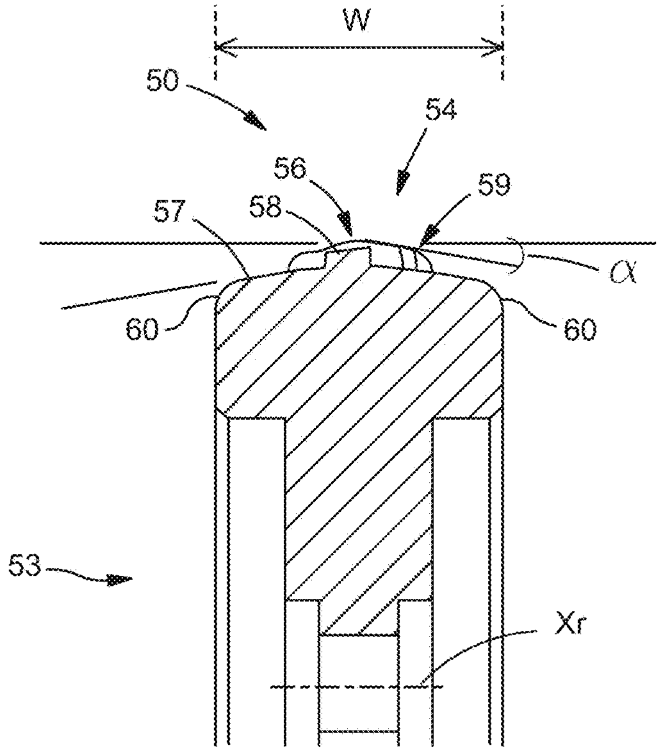
FIG. 10*c* shows a cross-section through the creasing tool of FIG. 10*a;*

In FIGS. 10*a* to 10*c* a fourth embodiment of the creasing tool 53 is shown. In the fourth embodiment, the creasing tool 53 is arranged similarly to the first embodiment, but the crease-line forming portion 56 and the peripheral deformation portion 59 are formed from a single continuous segment. The transverse surface areas 58 in the peripheral deformation portion 59 are provided with a proximal portion 61 that is wider than the distal portion 63.

This has the effect that the deformation is distributed over a larger area at the central crease-line forming portion 56 than at the distal portions 61. In this way, a wider (i.e. less sharp) crease-line can be achieved than with the creasing tool 53 of the previously described embodiments.

Additionally, only the distal ends 63 of the transverse surface areas 58 are separated from each other, while the proximal portions 61 are broadened in such a way that they merge to form a coalesced midrib 56. Hence, the proximal portions 61 of preceding and subsequent transverse surface areas 58 merge. Additionally, the proximal portions 61 of the opposite transverse surface areas 58 merge over the central axis M.

This type of creasing tool 53 can advantageously be used for performing pre-creasing operations as it prepares a fold in the fibrous substrate 35 for a subsequent and sharper ridge of a creasing tool 53.

In this embodiment, the slope angle α describes the inclination of the peripheral deformation portion 59 from a coalesced midrib 56 to the distal end portions 61. and in relation to the rotation axis Xr.

Figure 11A:
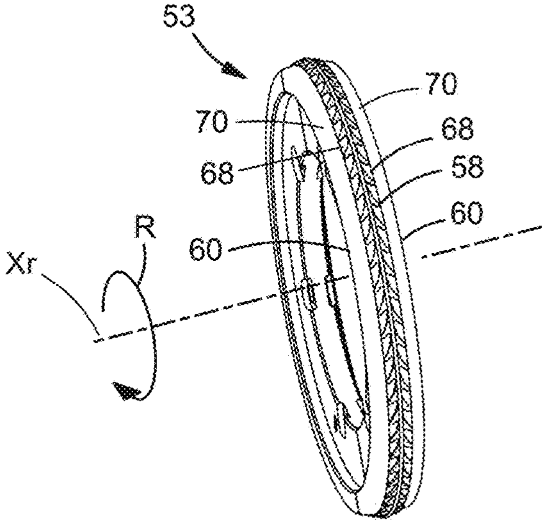
FIG. 11*a* shows a fifth embodiment of a creasing tool according to the invention.
Figure 11B:
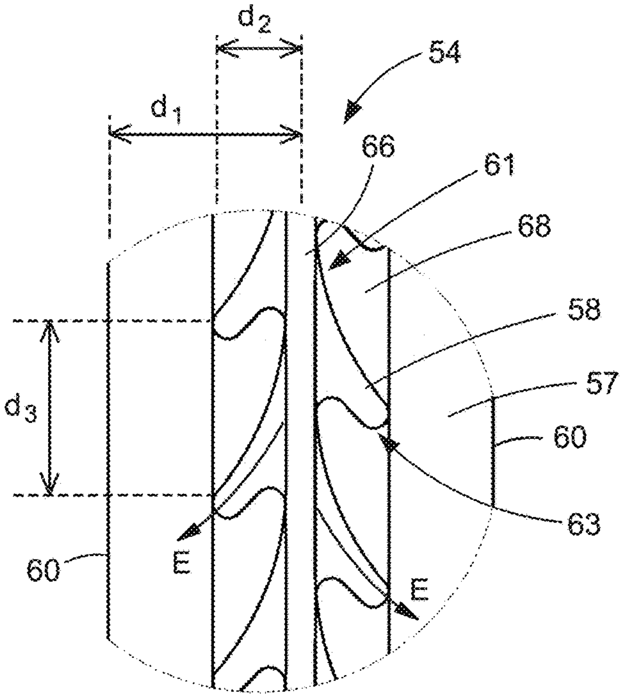
FIG. 11*b* shows a detail of the creasing tool of FIG. 11*a*.
Figure 11C:
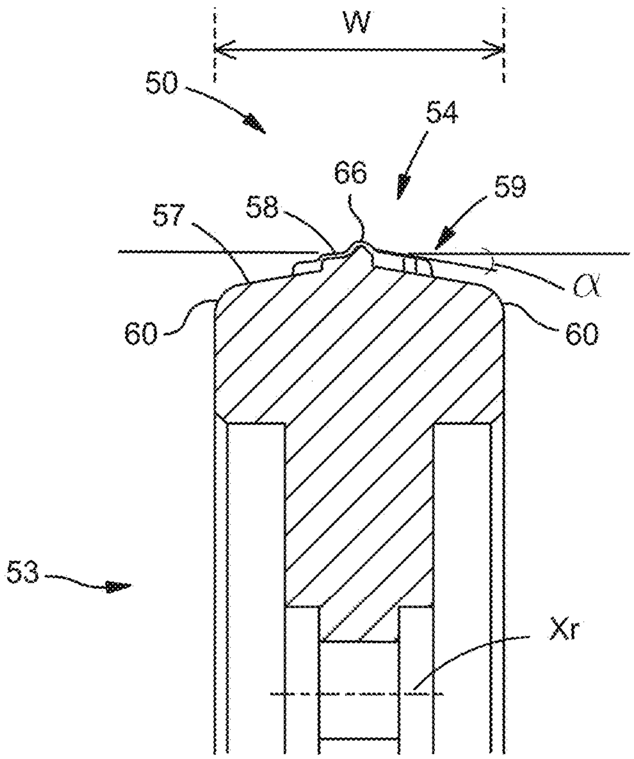
FIG. 11*c* shows a cross-section through the creasing tool of FIG. 10*a;*

In FIGS. 11*a* to 11*c* a fifth embodiment of the creasing tool 53 is shown. In the fifth embodiment, the creasing tool 53 is arranged similar to the fourth embodiment illustrated in FIGS. 10*a* to 10*c*, but further comprises an additional annular creasing ridge 66, protruding further away from the base surface 57 than the proximal portions 61 of the transverse surface areas 58. The annular creasing ridge 66 extends along the crease-line forming portion 56.

Like in the fourth embodiment, the proximal portions 61 of the transverse surface areas 58 are broadened in a direction towards the crease-line forming portion 56.

The annular creasing ridge 66 provides a sharper protrusion from the outer surface of the creasing tool 53 compared to the creasing tool 53 of the third embodiment, and therefore further increasing the preciseness of the crease lines formed by the creasing tool 53. However, the transverse surface areas 58 still provide a sufficiently distributed surface to prevent the cardboard from being teared apart.

Figure 12A:
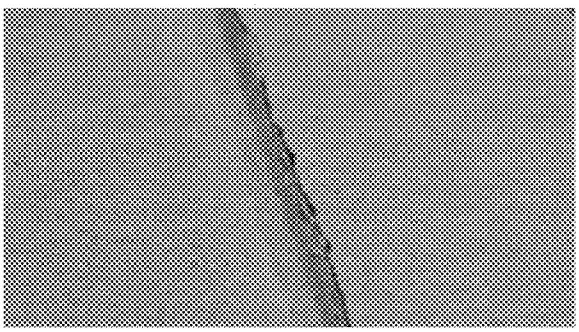
FIG. 12*a* illustrates a crease-line achieved with a prior art creasing tool as illustrated in FIG. 5*a;*
Figure 12B:
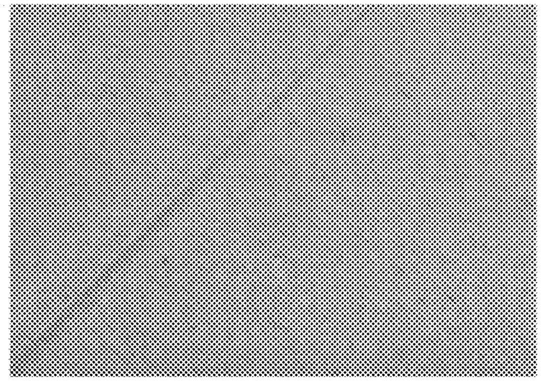
FIG. 12*b*, illustrates a crease-line achieved with creasing tool according to the present invention.

Several tests were completed for the creasing tool 53 of the present invention. These tests showed a significant reduced rupture phenomenon of a corrugated fibrous corrugated substrate 35 when using a creasing tool 53 according to the present invention. The result is illustrated in FIGS. 12*a* and 12*b*, and in which FIG. 12*a* shows a fibrous substrate 35 contacted by a prior art creasing tool (as illustrated in FIG. 5*a*). FIG. 12*b* shows a fibrous substrate 35 contacted by a creasing tool 53 of the present invention of the type illustrated in FIG. 8*b*. Hence, the present creasing tool 53 is able to demonstrate a reduced tearing effect on the fibrous substrate 35.

Figure 13:
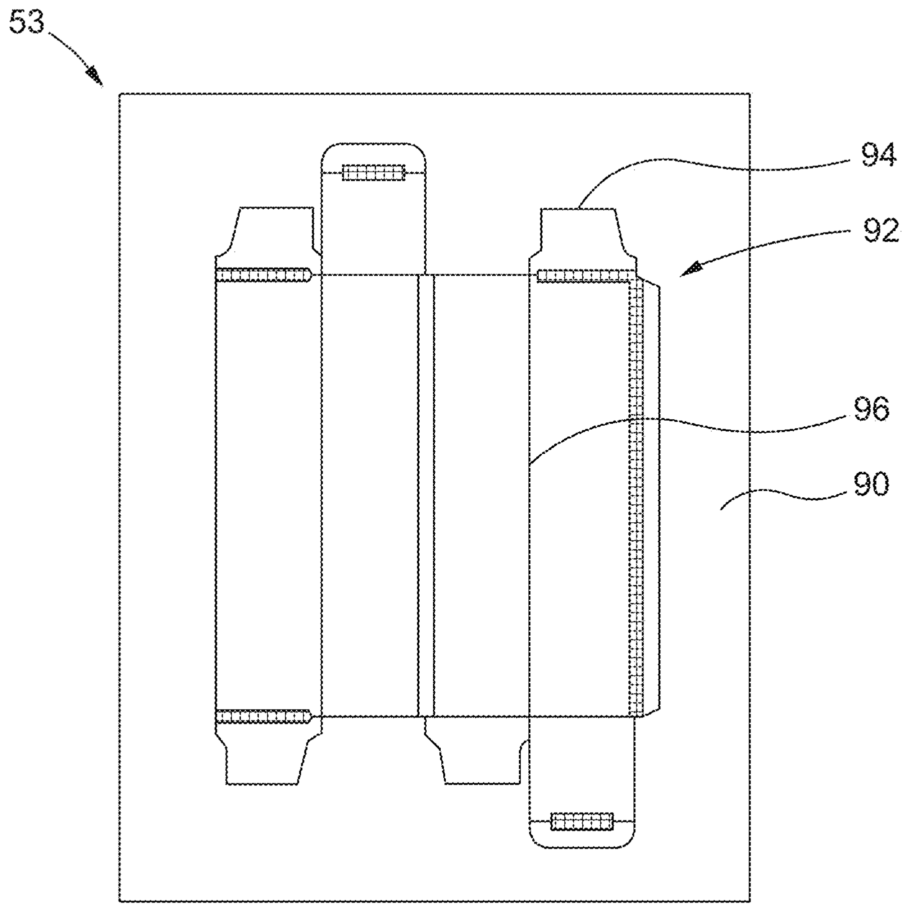
FIG. 13 is a further exemplary embodiment of the present invention showing a creasing tool in the form of platen press die.

The invention can be further applied to other tools suitable for creating crease lines. For instance, as illustrated in FIG. 13, the creasing tool 53 can be a die 53 for platen press. The die 53 can be provided with crease-forming edges (also referred to as rules) with a pattern corresponding to the relief portion 54, as illustrated in the embodiments of FIGS. 8*a* to 11*c*.

The die 53 comprises a die board 90 provided with a pattern of cutting edges 94 and creasing edges 96. The cutting edges 94 are located in the periphery of the die board 90 and will define the outer contour of the intermediate blank 1.

Hence in the embodiment of FIG. 13, the creasing tool further comprises cutting edges. This enables the creasing tool 53 to perform an additional cutting operation as it is pressed against the fibrous substrate 35. In the previous embodiments, the cutting is achieved by a separate unit, such as a slotter 24 illustrated in FIG. 3.

The invention claimed is:

1. A creasing tool configured to create a crease line in a fibrous substrate, the creasing tool comprising:

a contact portion having a base surface and a relief portion, the relief portion provided as a protruding pattern extending from the base surface and configured to be pressed against the fibrous substrate, wherein the relief portion comprises a crease-line forming portion and a peripheral deformation portion, and wherein the peripheral deformation portion comprises a plurality of discrete segments in a shape of curved transverse surface areas extending from the crease-line forming portion and in a direction transverse to a longitudinal direction of the crease-line forming portion, and protruding continuously further from the base surface in a direction from an edge of the creasing tool towards the crease-line forming portion.

2. The creasing tool according to claim 1, wherein the peripheral deformation portion is configured to apply a gradually increased contact pressure on the fibrous substrate in the direction towards the crease-line forming portion.

3. The creasing tool according to claim 1, wherein the crease-line forming portion and the peripheral deformation portion are connected.

4. The creasing tool according to claim 1, wherein the relief portion is centrally arranged on the contact portion.

5. The creasing tool according to claim 1, wherein the peripheral deformation portion is arranged laterally of the crease-line forming portion on at least one side thereof.

6. The creasing tool according to claim 1, wherein the crease-line forming portion is a continuous line.

7. The creasing tool according to claim 1, wherein the crease-line forming portion is protruding further from the base surface than the peripheral deformation portion.

8. The creasing tool according to claim 1, wherein the peripheral deformation portion is downwardly sloped at an angle in a direction from the crease-line forming portion and towards an edge of the creasing tool.

9. The creasing tool according to claim 1, wherein the transverse surface areas have a proximal portion located at the crease-line forming portion and a distal end shaped as a free end.

10. The creasing tool according to claim 9, wherein the creasing tool further comprises a midrib, wherein the midrib protrudes further away from the base surface than the proximal portion of the transverse surface areas.

11. The creasing tool according to claim 1, wherein the transverse surface areas have a larger cross-sectional area in a proximal portion than in a distal portion.

12. The creasing tool according to claim 1, wherein the crease-line forming portion is located centrally on the contact portion, wherein the transverse surface areas of the crease-line forming portion are mirrored around a central axis defined by the central crease-line forming portion, and wherein the transverse surface areas are offset.

13. The creasing tool according to claim 1, wherein the discrete segments are curved and converge at the crease-line forming portion to form the crease-line forming portion.

14. The creasing tool according to claim 1, wherein the creasing tool is provided as a creasing disc, and wherein the discrete segments extend at an angle in relation to a central plane defined by the crease-line forming portion.

15. A converting machine comprising:

the creasing tool according to claim 14, wherein the creasing disc is mounted in the converting machine such that the transverse surface areas extend in a transverse direction at an angle in relation to the central plane and in the direction of rotation of the disc, the angle being less than 90 degrees such that distal ends of the transverse surface areas are brought into contact with a blank before a proximal portion of the discrete segments.

16. A method of creating a crease line in a fibrous substrate with a creasing tool according to claim 1, the method comprising:

selecting a fibrous substrate having at least one corrugated layer, measuring a distance between flutes in the at least one corrugated layer, selecting a creasing tool having a transverse length of the transverse surface areas which is equal or larger than 50% of the flute distance, and pressing the creasing tool against the fibrous substrate such that a crease-line is obtained.

* * * * *